(12) United States Patent
Cunningham et al.

(10) Patent No.: US 8,487,493 B2
(45) Date of Patent: Jul. 16, 2013

(54) METHOD AND APPARATUS FOR CONTROLLING A BEARING THROUGH A PRESSURE BOUNDARY

(75) Inventors: Christopher E. Cunningham, Spring, TX (US); Rune Fantoft, Oslo (NO); Terje Hollingsaeter, Lommedalen (NO)

(73) Assignee: FMC Technologies, Inc., Houston, TX (US)

( * ) Notice: Subject to any disclaimer, the term of this patent is extended or adjusted under 35 U.S.C. 154(b) by 211 days.

(21) Appl. No.: 12/990,833

(22) PCT Filed: Apr. 30, 2009

(86) PCT No.: PCT/US2009/042249
§ 371 (c)(1),
(2), (4) Date: Nov. 3, 2010

(87) PCT Pub. No.: WO2009/137325
PCT Pub. Date: Nov. 12, 2009

(65) Prior Publication Data
US 2011/0050017 A1    Mar. 3, 2011

Related U.S. Application Data

(60) Provisional application No. 61/050,899, filed on May 6, 2008, provisional application No. 61/127,511, filed on May 14, 2008, provisional application No. 61/075,135, filed on Jun. 24, 2008, provisional application No. 61/112,305, filed on Nov. 7, 2008.

(51) Int. Cl.
*H02K 7/09*       (2006.01)
*F04D 13/08*      (2006.01)

(52) U.S. Cl.
USPC ............ 310/90.5; 318/599; 417/423.3

(58) Field of Classification Search
USPC ............ 310/90.5; 340/855.3; 417/423.3
See application file for complete search history.

(56) References Cited

U.S. PATENT DOCUMENTS

| | | | | |
|---|---|---|---|---|
| 4,500,142 A | * | 2/1985 | Brunet | 310/90.5 |
| 4,879,500 A | * | 11/1989 | Kanemitsu | 318/632 |
| 5,107,192 A | * | 4/1992 | Kirchberg et al. | 318/540 |

(Continued)

FOREIGN PATENT DOCUMENTS

FR    2 716 700    2/1994

OTHER PUBLICATIONS

PCT Search Report and Written Opinion from PCT/US2009/042249 dated Nov. 11, 2009.

*Primary Examiner* — Burton Mullins
(74) *Attorney, Agent, or Firm* — Williams, Morgan & Amerson, P.C.

(57) ABSTRACT

A rotating apparatus includes a housing, a shaft at least partially disposed within a first pressure environment defined by the housing, a first magnetic bearing supporting the shaft and being at least partially disposed within the first pressure environment, a sensor operable to sense a position of the shaft relative to the first magnetic bearing, a controller disposed in a second pressure environment independent of the first pressure environment and operable to communicate with the sensor and to generate a control signal for the first magnetic bearing based on the sensed position, and a communication device operable to communicate the control signal between the controller and the first magnetic bearing and to communicate the sensed position between the sensor and the controller without penetrating a pressure boundary defined between the first and second pressure environments.

23 Claims, 9 Drawing Sheets

U.S. PATENT DOCUMENTS

| | | | | |
|---|---|---|---|---|
| 5,355,042 A | * | 10/1994 | Lewis et al. | 310/90.5 |
| 5,376,871 A | * | 12/1994 | Takara et al. | 318/610 |
| 5,939,813 A | * | 8/1999 | Schob | 310/425 |
| 6,350,109 B1 | | 2/2002 | Brunet et al. | 417/365 |
| 6,736,593 B2 | * | 5/2004 | Namiki et al. | 415/1 |
| 7,053,582 B2 | * | 5/2006 | Ueyama et al. | 318/632 |
| 2006/0037743 A1 | * | 2/2006 | Head | 166/66.4 |
| 2007/0200443 A1 | * | 8/2007 | Baudelocque et al. | 310/90.5 |
| 2007/0278879 A1 | * | 12/2007 | Kaminski et al. | 310/86 |
| 2008/0054741 A1 | * | 3/2008 | Oyama | 310/68 A |
| 2008/0070499 A1 | * | 3/2008 | Wilhelm et al. | 455/41.1 |

* cited by examiner

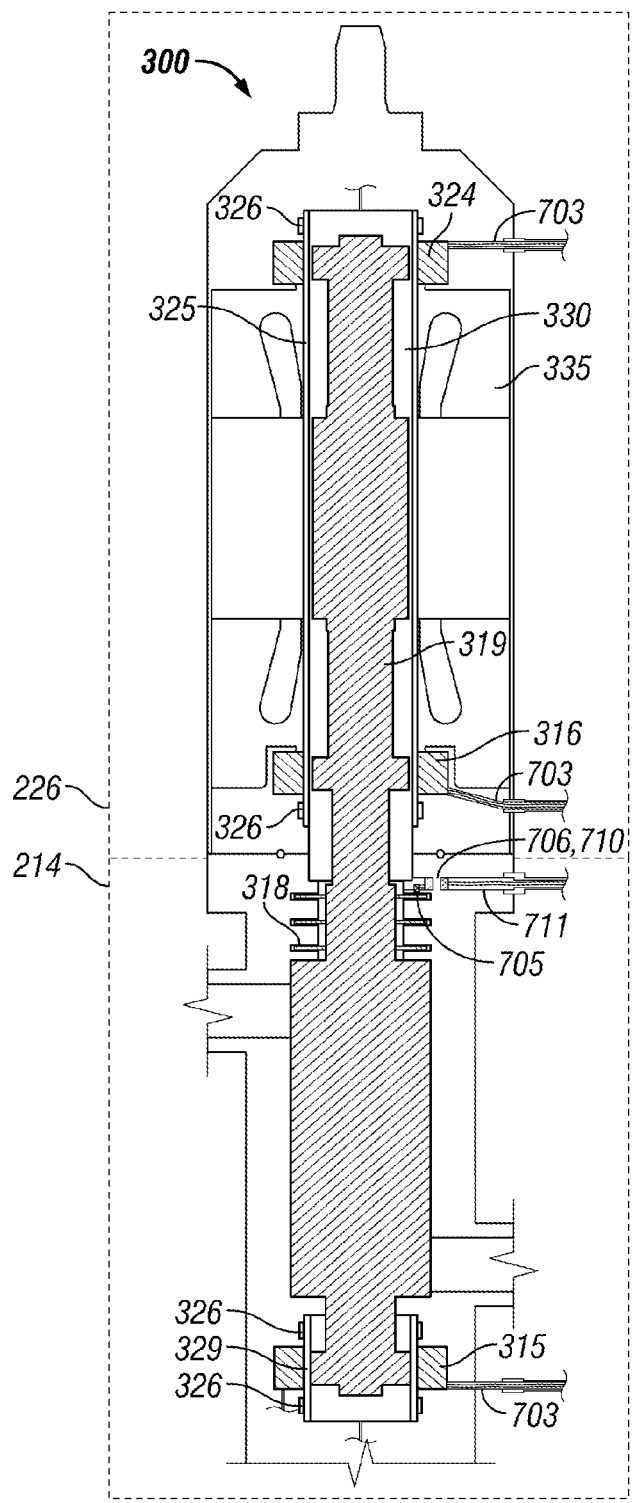
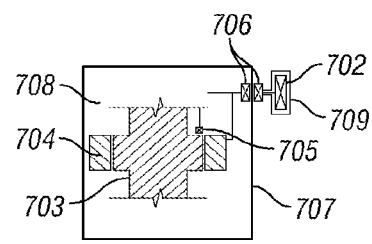
FIG. 7A
FIG. 7B

METHOD AND APPARATUS FOR CONTROLLING A BEARING THROUGH A PRESSURE BOUNDARY

BACKGROUND OF THE INVENTION

1. Field of the Invention

The disclosed subject matter relates generally to a bearing control system that operates through a pressure boundary.

2. Description of the Related Art

Electrically driven pumps have been in common use for many years. One application of such an electrically driven pump is in the field of hydrocarbon service, where subsea pumps may be used. Subsea pumps have been used to pump multiphase fluids, typically including any pump-able combination of oil, gas, water and/or solids, as well as single-phase fluids, e.g. water and/or oil. Conventionally, one of three subsea pump/motor technologies are typically deployed subsea on commercial applications. Two technologies may be characterized as having a "short-fat" induction motor driving a relatively short rotor-dynamic pump (e.g., up to 14 stages), or driving a twin-screw positive displacement pump, which is also relatively short. Typically, rotor-dynamic pumps have been oriented vertically with the induction motor positioned over the pump, whereas the twin-screw pump units have been oriented horizontally. The third pump/motor technology deployed subsea employs a repackaged electric submersible pump (ESP), which may be characterized as a "long-skinny" induction motor driving a long-skinny rotor-dynamic pump (e.g., including several tens of stages). Subsea ESPs may be deployed vertically in a caisson/dummy-well or riser, or in a near-horizontal orientation proximate the seabed, (e.g., on a foundation structure or in a flowline jumper).

FIG. 1 is a representation of a prior art subsea multiphase rotor-dynamic pump/motor assembly, referred to hereinafter as a pump unit 100 that includes a pump 101 and an induction motor 116. Multiphase fluid enters the pump 101 into a flow-mixing chamber 102 via inlet 103. The mixed fluid next enters a pump compression chamber via inlet 104 where it is progressively pressurized through a series of stages comprising rotating impellers 105 and static diffusers 106. The resulting higher pressure fluid is ultimately exhausted to the downstream piping (not shown) through diffuser chambers 107 and an outlet 108.

The impellers 105 are unitized to a pump shaft 109, whereas the diffusors 106 are unitized to a pump pressure housing 110. The shaft 109 is supported by radial bearings 111, 112 and an axial bearing 113, the latter being designed to support the weight of the shaft 109 and components integrated thereto plus the thrust load developed by the pump hydraulic elements and the hydraulic piston effect associated with the barrier fluid system (BFS) acting on the shaft 109, flexible coupling 114, and an optional balance piston (not shown). Relevant design codes impose multiplication factors that add to axial bearing 113 load carrying capacity requirements. The shaft 109 is connected to an induction rotor 115 of the induction motor 116 by a flexible coupling 114 that transfers torque but not axial load. The rotor 115 is turned by the electro-magnetic forces generated by a stator 117. The rotor 115 is supported by radial bearings 118, 119 and an axial bearing 120, the latter being designed to support the weight of the rotor 115, the hydraulic piston effect associated with the BFS interaction therewith and on the flexible coupling 114, and design code multiplication factors. All the bearings are typically hydrodynamic tilting-pad mechanical bearings for which the rotating versus non-rotating elements are separated under dynamic ("hydraulic-lift") conditions by a film from a pressurized fluid 121. Contact between bearing mechanical elements may occur whenever there is no relative movement between those elements. Fluid 121 for creating the film is provided by a BFS described in greater detail elsewhere in this document.

The barrier fluid 121 distributed widely within the pump unit 101 should ideally be maintained at a pressure greater than the outlet pressure of the pump 101 to serve its multiple functions in conventional systems, such as that illustrated in FIG. 1. The barrier fluid 121 is typically supplied from a remote location into the pump unit 100 to surround induction motor stator 117 and all of the rotating equipment except the pump hydraulics. Controlled-leakage rotating mechanical seals 122, 123 that will vent barrier fluid pressure above a certain level into the process stream are provided near both ends of the impeller stack on the shaft 109 to maintain the barrier fluid 121 in the desired areas while also creating the required higher-than-pump-outlet pressure in those areas. The pressure-bias created by the rotating mechanical seals 122, 123 is one method for excluding process fluids and associated debris and corrosion agents, etc., from sensitive areas in the pump 101 and induction motor 116. The controlled-leakage of the mechanical seals 122, 123 provides a protective fluid film and cooling effect for those seals. Because the mechanical seals 122,123 leak barrier fluid, the BFS must periodically be resupplied, resulting in undesirable monitoring and maintenance activities that directly increase operating expense. Furthermore, depending on the specific features of a supplier's motor design, the BFS may suffer an onerous requirement to be maintained dehydrated to a high-specification level.

In addition to lubricating and cooling the bearings 111, 112, 113, 118, 119, 120 and mechanical seals 122, 123, another function of the BFS is to provide electrical insulation and cooling for the stator 117 and associated items such as high-voltage power penetrators 124. The aforementioned items, especially the stator 117 generate large amounts of heat during operation. Damage resulting in system failure will occur quickly if heat beyond design capacity is not removed from the system. Owing partly to the pump and motor multiple, thick wall-section, limited externally-exposed-surface-area housings 110, 125 and 126, 127 respectively, and also to heat-transfer characteristics of the multiple materials involved, including the barrier fluid, heat transmitted naturally between the heat-generating elements and the barrier fluid 121 cannot be adequately moved by passive means alone to the environment surrounding the pump unit 100 (i.e., via conduction, convection and/or radiation). It is therefore necessary, for all but low-power systems, that barrier fluid 121 be circulated through an external long-conduit heat-exchanger, possibly including multiple flow-paths 128. Such a system typically also requires a pump to circulate the barrier fluid 121, which in FIG. 1 is satisfied by a dedicated impeller 129 unitized to the process pump shaft 109.

A typical barrier fluid system associated with prior art subsea pump systems comprises many components, some positioned proximate the subsea pump and others located on a topside (above water) facility usually several miles away. A typical BFS comprises a hydraulic power unit, fluid storage tanks, cleaning and dehydrating equipment, filters, pumps for moving fluids between various topside components and for delivering the barrier fluid to the subsea pump, flow restrictors, non-return valves, accumulators, full-bore valves, pipes and fittings, one or more lines in the subsea umbilical, pressure and temperature sensors, level-monitoring instruments, and control systems. Because several of these components are critical to the correct functioning of the system and therefore the integrity and reliability of the associated subsea pump, redundant such components are typically provided for each field application. Many of these components require periodic maintenance, and the amount and condition of the barrier fluid in the storage tank(s) must be carefully monitored and maintained at all times. Barrier fluid circulated within prior art subsea pumps and motors is also the primary means for removing heat therefrom, especially from electric motors, and there are several components associated with that function, including dedicated pumps/impellers and heat-exchanger tubes.

This section of this document is intended to introduce various aspects of art that may be related to various aspects of the disclosed subject matter described and/or claimed below. This section provides background information to facilitate a better understanding of the various aspects of the disclosed subject matter. It should be understood that the statements in this section of this document are to be read in this light, and not as admissions of prior art. The disclosed subject matter is directed to overcoming, or at least reducing the effects of, one or more of the problems set forth above.

SUMMARY OF THE INVENTION

One aspect of the present subject matter is seen in a rotating apparatus including a housing, a shaft at least partially disposed within a first pressure environment defined by the housing, a first magnetic bearing supporting the shaft and being at least partially disposed within the first pressure environment, a sensor operable to sense a position of the shaft relative to the first magnetic bearing, a controller disposed in a second pressure environment independent of the first pressure environment and operable to communicate with the sensor and to generate a control signal for the first magnetic bearing based on the sensed position, and a communication device operable to communicate the control signal between the controller and the first magnetic bearing and to communicate the sensed position between the sensor and the controller without penetrating a pressure boundary defined between the first and second pressure environments.

Another aspect of the present subject matter is seen in a pump unit including a pump operable to pump a fluid and a motor operatively coupled to the pump. The motor includes a housing, a rotor, a stator disposed around the rotor in a stator cavity, a first can interfacing with the housing to isolate the stator from the rotor to at least partially define a rotor cavity separate from the stator cavity, a first magnetic bearing supporting the motor shaft and at least partially disposed within the rotor cavity, a sensor operable to sense a position of the shaft, a controller disposed outside the rotor cavity and operable to communicate with the sensor and generate a control signal for the first magnetic bearing based on the sensed position, and a communication device operable to interface with one of the housing or the can to communicate the control signal between the controller and the first magnetic bearing through a pressure boundary defined between the stator cavity and the rotor cavity without penetrating the pressure boundary.

BRIEF DESCRIPTION OF THE DRAWINGS

The disclosed subject matter will hereafter be described with reference to the accompanying drawings, wherein like reference numerals denote like elements, and:

FIGS. 5A-5E-2 illustrate different embodiments of cooling elements for the pump unit of FIG. 3;

FIGS. 7A-7C illustrate the interrelationship between components involved in providing control and power for active magnetic bearings in the pump unit of FIG. 3.

Figure 1:
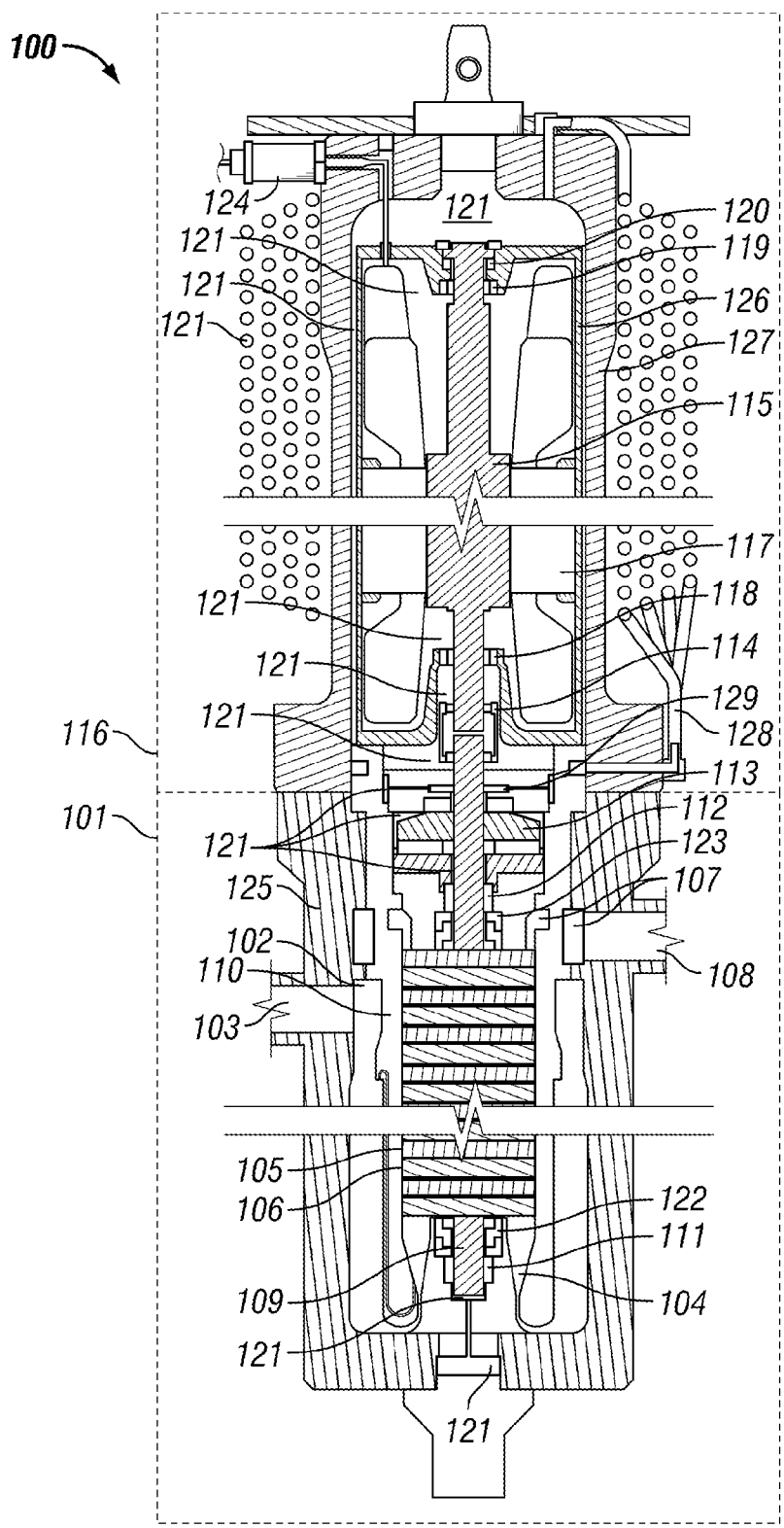
FIG. 1 is a representation of a prior art subsea multiphase rotor-dynamic pump unit.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

DETAILED DESCRIPTION OF SPECIFIC EMBODIMENTS

One or more specific embodiments of the disclosed subject matter will be described below. It is specifically intended that the disclosed subject matter not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the disclosed subject matter unless explicitly indicated as being "critical" or "essential."

The disclosed subject matter will now be described with reference to the attached figures. Various structures, systems and devices are schematically depicted in the drawings for purposes of explanation only and so as to not obscure the disclosed subject matter with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
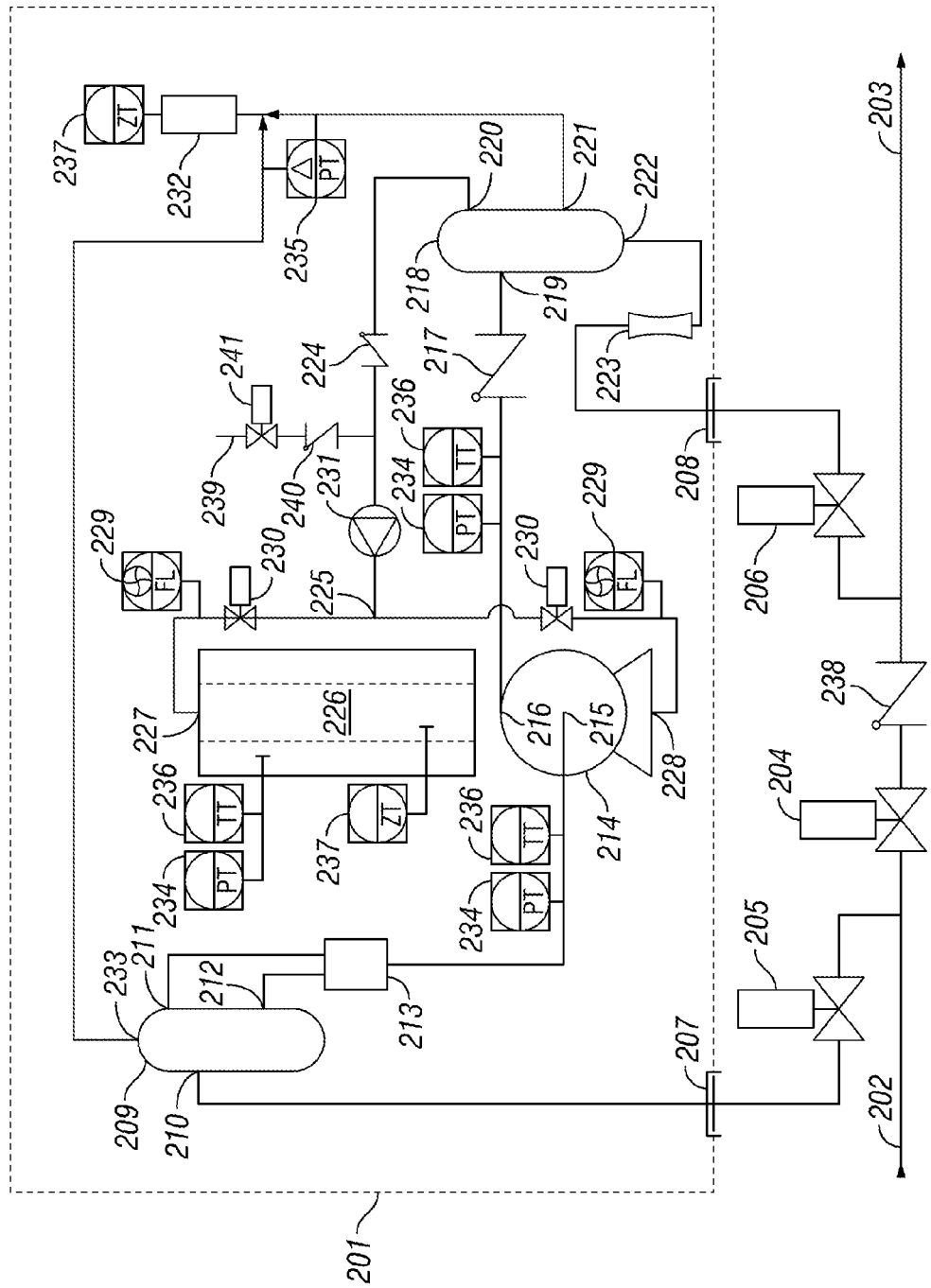
FIG. 2 is a schematic process flow diagram of a pump module and immediately adjacent associated pump system elements in accordance with one embodiment of the present subject matter.
Figure 3:
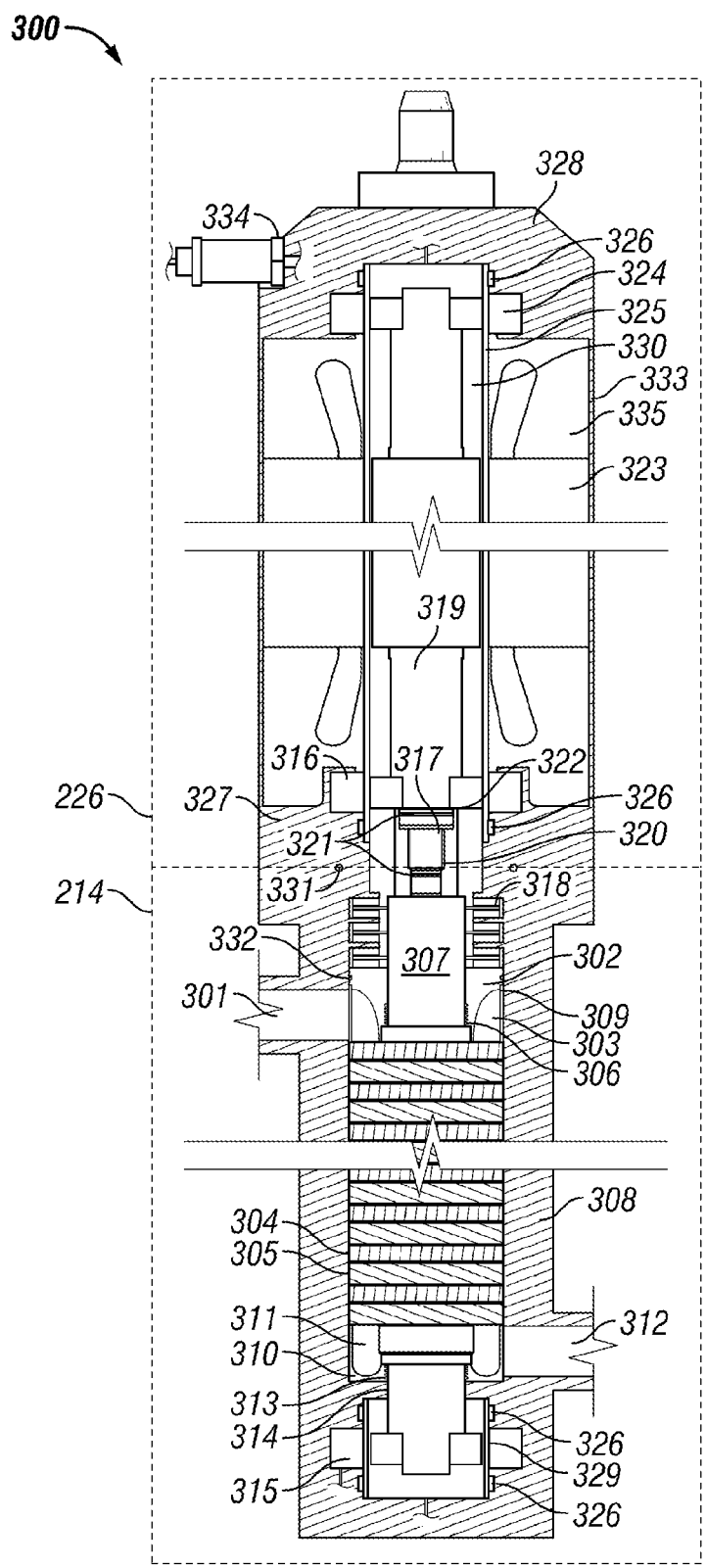
FIG. 3 is a representation of the pump module of FIG. 2.

Referring now to the drawings wherein like reference numbers correspond to similar components throughout the several views and, specifically, referring to FIGS. 2 and 3, the disclosed subject matter shall be described in the context of a pump module 201 and immediately adjacent associated pump system portions. Process fluids, whether multiphase or single-phase, enter and exit the system via conduits 202 and 203, respectively. When a valve 204 is closed and valves 205, 206 are open, process fluids are diverted from the main line into the pump module 201 via an inlet connector 207, and out of pump module 201 via an outlet connector 208. A non-return valve 238 prevents back-flow of production fluids from the flowline whenever the valve 204 is open.

In the event gas-slugs are anticipated within the inlet process stream, optional slug-catcher(s) 209 may be provided for receiving the multiphase process stream through an inlet 210 and exhausting predominantly gas through outlet 211 and liquids/solids through outlet 212. Alternative slug-catcher configurations, including single-outlet (multiphase) designs known to those of ordinary skill in the art, may also be implemented in conjunction with the disclosed subject matter.

An in-line mixer 213 receives a single raw process inlet stream in the event no slug-catcher is provided, or single or dual inlet streams in the event a slug-catcher is provided (i.e., depending on the slug-catcher configuration). For dual inlets, one will typically receive substantially gas and the other substantially liquids-solids. In all cases in-line mixer 213 exhausts a substantially homogenized multiphase flow stream to a process pump 214 via inlet 215.

When operating, the process pump 214 exhausts fluids at greater than inlet pressure via outlet 216. After passing through a non-return valve 217, pump outlet-pressure fluid will enter a gas/liquid extraction unit (G/LEU) 218 via inlet 219. The embodiment shown in FIG. 2 and the following description depicts the G/LEU 218 as a vertical separation vessel, however all types of separators, including horizontal vessels and vessels with enhanced "internals" and in-line concepts, etc., may be employed. The G/LEU 218 substantially separates and stratifies the multiphase inlet stream constituents into gas (upper), liquid (middle) and liquid/solids (lower), making gas and liquids available for use by other system components via outlets 220 and 221, respectively. For a variety of reasons, optimum separation of inlet fluids into discrete gas, liquid and liquid/solids streams may not always be achieved, and therefore the separated streams intended for use by other system components may comprise multiple components, e.g. liquids with the gas, gas in the liquids, solids in either or both of the foregoing, etc. The bulk of the inlet flow stream will exit the G/LEU 218 via outlet 222. A multiphase flow meter (MPFM) 223 is shown in FIG. 2 in an appropriate location, however its presence or absence imparts no significant functional implications for the pump module 201.

Gas provided to the G/LEU 218 outlet 220 is routed through a non-return valve 224 and split 225 on its way to motor 226 and pump 214 injection points 227 and 228, respectively. Alternatively, one or more non-return valve(s) 224 may be positioned anywhere downstream of the outlet 220 (e.g., one each adjacent injection points 227, 228) for reducing the compressible volume of fluid (e.g., gas) downstream thereof. The conduit and associated elements between the outlet 220 and injection points 227, 228 is referred to as the "flushing circuit", and its function is to create and maintain a gas-buffer between the rotor 319 (see FIG. 3) of the motor 226 and its "can" 325 (see FIG. 3) and the shaft 307 (see FIG. 3) of the pump 214 and its "can" 329 (see FIG. 3). The use of gas for the noted cavities reduces windage losses between rotating and static elements of the system. Furthermore, because gas has low shear resistance and is a poor conductor of heat, less heat will be generated in the "air gap" and less heat will be transferred into adjacent stator cavities. The foregoing noted, the pump module 210 may accommodate liquid and some volume of solids in the aforementioned cavities, although efficiency may be reduced.

Optional meters 229 on each injection-leg of the flushing circuit enable verification of flow in the associated conduit, and optional valves 230 enable select isolation of each injection-leg and corresponding concentration of flow in the other leg. Other means for verifying flow in the injection-legs may also be used (e.g., flow meters).

A pump, compressor or fan 231 (henceforward, "pump" 231) may be optionally provided for increasing pressure in the flushing circuit supply line to a level greater than pump 214 exhaust pressure. The location of the pump 231 in FIG. 2 is illustrative only, as different positions may be used, as described in greater detail below. In one embodiment, the injection points 227, 228 may be placed as far removed from pump hydraulics as possible, to help ensure that pump and motor dynamic elements outboard of the labyrinth seals 306, 313 (see FIG. 3) will be exposed only to semi-processed flushing circuit fluids (e.g., preferentially gas, solids removed). Excluding raw process fluids from the noted areas will improve the performance and longevity of the pump unit.

Liquid fluid provided to the outlet 221 of the G/LEU 218 is routed through a choke 232 on its way to an inlet 233 of a slug-catcher 209 or some other point upstream of the pump 214. The conduit and associated elements between the outlet 221 and the inlet 233 is referred to as the "liquid recirculation circuit", and its function is to increase the availability of liquid in the pump 214 inlet stream to improve pump performance, especially in the event a gas-slug passes through the system. The choke 232 reduces the pressure of the fluid at the G/LEU outlet 221 to a level approximating the pressure at the inlet 207 to the pump module 201.

Sensors/transmitters for pressure 234, differential pressure 235, temperature 236, position 237, and other sensors depending on the particular implementation, are distributed throughout the pump module 201 to enable condition and performance monitoring of the system. Use of the information provided by such devices enables improved performance and longevity for the pump unit.

A chemical injection supply line 239 and associated non-return valve 240 and isolation valve 241 enable controlled delivery of a fluid, such as methanol or glycol, into the flushing circuit to help avoid the formation of hydrates in downstream areas associated primarily with prolonged shutdowns. This circuit also provides the ability to purposely flush debris or blockages from downstream lines and/or cavities.

As mentioned previously, an optional pump 231 may be provided to increase pressure in the flushing circuit to a level greater than exhaust pressure from process pump 214 and, as a consequence, ensure that flow across labyrinth seals 306, 313 is from the flushing circuit-side toward process fluids inside the pump 214. Also noted previously, the pump 231 may take several forms, and as such its position in FIG. 2 is exemplary, not prescriptive.

Although the G/LEU 218 is illustrated as being disposed down stream of the pump module 201 (i.e., at outlet pressure), it is contemplated that the G/LEU 218 may, in some embodiments, be disposed upstream of the pump module 201 (i.e., at inlet pressure). In such applications a flushing pump may be used to increase the pressure of the extracted flushing medium (e.g., the gas component) to a pressure near or higher than the pump exhaust pressure.

One solution for increasing pressure in the flushing circuit is to add a conventional, substantially self-contained, electrically or hydraulically powered pump 231 thereto, powered from a remote location, and typically positioned between points 220 and 225. Alternatively, one-each such pump may be added to individual flushing circuit legs defined between points 225 and 227 and between points 225 and 228. Depending on the remote or local power source that drives such pump(s) 231, it/they may operate completely independently of the process flow or be available only when there is process flow through pump module 201 or the conduit defined by points 202 and 203. Flow in the flushing circuit itself, the liquid recirculation circuit, or a bypass line tapped-off either of those or any other process-supplied conduit associated with the pump system are exemplary process-flow-dependent sources.

The pump(s) 231 may also rely on flow through some other conduit, such as a chemical injection supply line, water injection line, gas-lift line, bypass line tapped-off any other fluid line, etc. Some of the latter sources may also be used to directly supply the injection points 227, 228 as an alternative to, or in combination with the flushing circuit embodiment illustrated in FIG. 2, which supplies partially processed gas.

Potential power sources local to the pump system encompass a wide variety of energy conversion means. For example, an impeller in any flow stream may be directly coupled via a shaft to drive an associated impeller to act on a separate flow stream, e.g. the pump(s) 231, 504, etc., or to drive a generator to produce electricity that can be used by any electrically powered device. Such directly coupled devices will typically, but not exclusively, share a common shaft that passes through a barrier that separates the discrete fluids. Such shaft will typically be supported by mechanical bearings, however magnetic bearings may also be used.

An impeller in any flow stream may alternatively be magnetically-coupled to another impeller residing in an adjacent, typically concentric, isolated flow path to effect pump functionality. An impeller in any flow stream may alternatively be magnetically-coupled to a generator stator to produce electricity that can be used by any of the pump(s) 231, 504, etc., or other electrically powered devices.

As will be described in greater detail below in reference to FIG. 5E, the environmental cooling/thermal flow described in association with the shroud 519 is a potential source of power, albeit likely best suited to generating electricity via turbine generator.

The ability to operate the pump(s) 231, 504 independent of pump module 201 or process flow may be advantageous, especially following shut-down of the pump module 201. For some hydrocarbon well pumping applications in particular, the process bore shut-in static pressure (supplied by wells and/or flowline head, e.g. as a result of substantial water depth) can be greater than the pumped-process flowing pressure. Following shut-down, the potentially slow-building process pressure might affect the properties of the fluids in the motor rotor cavity 330 and pump magnetic bearing rotor cavity residing between the high pressure rated can (HPRC) 329 and the shaft 307. Depending on the reason for the shutdown, the chemical injection supply line 239 may enable displacement of the fluids in the aforementioned rotor cavities with methanol, glycol, or a fluid fulfilling a similar purpose.

Another advantage of being able to operate the pump(s) 231, 504 following cessation of process flow, especially when unplanned, is the ability to maintain forced-cooling for motors so equipped, thereby avoiding an equipment-life-threatening temperature rise that naturally follows loss of cooling fluid circulation for such motors.

FIG. 3 is a diagram of an exemplary, non-limiting pump unit 300 that may be used in the system of FIG. 2. The design illustrated is one of any number of variants satisfying the intent of the disclosed subject matter including, without limitation, reversing the positions of the inlet 301 and outlet 312, and thereby the direction of fluid flow through the pump. Returning to FIG. 3, multiphase fluid enters the pump 214 through inlet 301. The fluid is redirected by an inlet device 302 within the pump inlet chamber 303 for subsequent pressurization by one or more stages that include rotating impellers 304 interacting with associated static diffusers 305.

The inlet device 302 may incorporate a labyrinth seal 306 toward the pump shaft 307. However, in some embodiments, that feature may be positioned elsewhere nearby, possibly in a dedicated part/parts. The labyrinth seal 306 acts as a restriction to resist flow/transfer of media between adjacent fluid volumes and, in the case of the illustrated embodiment, helps build and maintain pressure in the volumes supplied by the flushing circuit to a level at least as high as pump exhaust pressure. In so doing, the labyrinth seal 306 facilitates creation and maintenance of a preferred dynamic environment within the rotor cavity 330, directly, and within the cavity internal to the HPRC 329 associated with magnetic bearings 315, indirectly (i.e., gas devoid of debris and liquids). The labyrinth seal 306 in combination with flushing system effects described previously is intended to exclude raw process fluids from the noted areas. Various types of gas seals may be used in place of labyrinth seals 306, however those may be more subject to wear and typically generate heat.

To protect the pump body 308, the inlet chamber 303 may include a sleeve 309. Increased-pressure fluid exits the stack of impellers 304 and diffusers 305 into an outlet device 310 which redirects fluid from the exhaust chamber 311 to an outlet 312 and protects the pump body 308. The outlet device 310 may incorporate a labyrinth seal 313 toward the pump shaft 307. However, in some embodiments, that feature may be positioned elsewhere nearby (e.g., at location 314), possibly in a dedicated part/parts. The labyrinth seal 313 has the same function as described previously for the labyrinth seal 306, and may also be substituted by gas seals.

The pump body 308 and internal components may be constructed from inherently erosion and/or corrosion resistant materials, and/or they may be coated, overlayed or otherwise treated to improve their performance and/or durability under the service conditions anticipated for specific applications.

The impellers 304 are unitized to the pump shaft 307, whereas the diffusers 305 are unitized to the pump body 308. The shaft 307 is suspended at its lower end by a radial magnetic bearing 315 and at its upper end by a radial magnetic bearing 316, the latter through the effect of a rigid coupling 317. Axial loads, including predominantly the weight of the shaft 307 and impellers 304, thrust developed when the pump is operating, the hydraulic piston effect associated with the flushing system acting on the shaft 307, an optional balancing piston (not shown), the weight of the rotor 319 of the motor 226, and relevant design-code-imposed multiplication factors, are carried by one or more axial magnetic bearing(s) 318, also known as magnetic thrust bearings. The single axial magnetic bearing functionality may, as an alternative to a dedicated axial magnetic bearing, be provided integral to a radial magnetic bearing 315, 316, 324. Similarly, the multiple axial magnetic bearings functionality may, as an alternative to the stacked/staged arrangement shown at 318, be provided in distributed form, e.g. via dispersed dedicated axial magnetic bearings or by incorporating axial load-carrying functionality into one or more of the radial magnetic bearings 315, 316, 324.

The shaft 307 is connected to the rotor 319 by rigid coupling 317 that transfers torque via spline 320, bending loads via a press-fit stepped-socket interface including two axially-separated soft-metal inserts 321, and axial loads via shoulder 322.

The permanent magnet rotor 319, or in an alternative embodiment an induction rotor, is turned by the electro-magnetic forces generated by the stator 323. The rotor 319 is suspended by radial magnetic bearings 316, 324, and by axial magnetic bearing(s) 318.

The magnetic bearings 315, 316, 318, 324 may be passive (e.g., permanent magnet), active (e.g., electro-magnetic), or a combination thereof. Passive magnets require no external power source to be effective, which is useful to ensure suspension of dynamic components during shipping and storage (i.e., when power is not available) and also during spin-down following planned and/or unplanned removal of power for a previously operating system. When used in combination with appropriate sensors and a suitable control system, active magnets enable provision of supplemental and directional suspension force for maintaining desired positioning of dynamic components during process transients and/or other imbalance conditions. A combination of passive and active magnetic bearing components allows support in a non-powered state and positioning under dynamic conditions. Contingency mechanical bearings (not shown) may be provided as a backup to passive and/or active magnetic bearings.

A high-pressure rated can (HPRC) 325 is disposed between the rotor 319 and the stator 323 and forms pressure-tight seals 326 toward a base-flange 327 and a crown-flange 328 in such a way that significant pressure end-loads are not carried by the HPRC 325, thus enabling minimum wall thickness for a specified pressure rating. Generally, the HPRC 325 is capable of withstanding pressure up to the maximum head pressure generated at the pump 214 or the maximum wellhead shut-in pressure, whichever is greater. The pressure outside the HPRC 325 generally corresponds to the ambient pressure resulting from the submerged depth of the pump module 201. The worst case loading conditions may vary depending on the particular application environment for the pump unit 300, and may thus affect the strength requirements for the HPRCs 325, 329. While seals 326 are depicted as being radial seals they may also be face seals, corner seals, or any other configuration seals substantially satisfying the low-end-loads condition, including any form of direct interference and/or bonded interface, regardless if any bonding material is employed and regardless the nature of the bond (e.g., pressurized fluid, molecular/atomic (e.g., chemical or heat-fusion)), etc., between the HPRC 325 and the flanges 327, 328.

The rotor cavity 330 resides between the rotor 319, pump shaft 307, HPRC 325, seals 326, crown-flange 328, base-flange 327, gasket 331, pump body 308, inlet device 302, seal 332, and labyrinth seal 306. As shown in FIG. 3, the HPRC 325 spans only a portion of rotor cavity 330; however, alternative embodiments may have the HPRC 325 spanning as much as the full length of rotor cavity 330.

The rotor cavity at least partially enclosed by the HPRC 329 in the pump 212 resides between the HPRC 329, the pump body 308, seals 326, the pump shaft 307, the outlet device 310, and the labyrinth seal 313. As shown in FIG. 3, the HPRC 329 spans only a portion of the aforementioned rotor cavity; however alternative embodiments may have the HPRC 329 spanning as much as the full length of that rotor cavity. The HPRC 329 in the pump 212 has substantially the same attributes and considerations associated with the radial magnetic bearing 315 as does the HPRC 325 associated with rotor 319 of the motor 226 and the radial magnetic bearings 316, 324.

The material of the HPRCs 325, 329 is selected to provide high magnetic field permeability and sufficient strength to enable thin wall sections for application-specific pressure conditions. A thinner wall section reduces the impact of the HPRCs 325, 329 on motor power factor and efficiency. Exemplary materials for the HPRCs 325, 329 include carbon fiber or similar composite material, ceramic, stainless steel, titanium, etc.

Figure 7C:
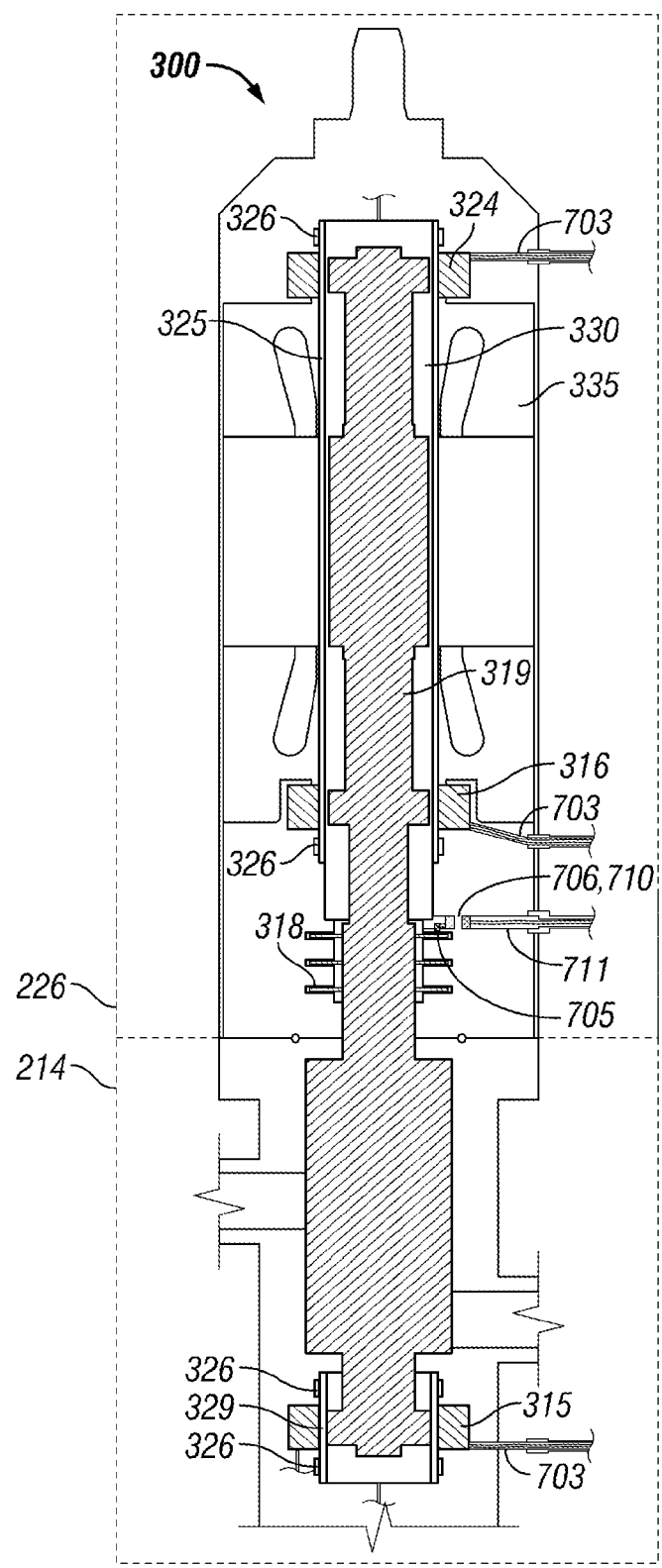

In an embodiment where one or more active magnetic bearings are employed, the relative position of important rotating and non-rotating suspension components may be monitored and power may be provided as needed to enable the active magnetic bearings to compensate for deviations from the desired relative positions. The mechanism for data communication and power transfer typically comprises wires routed between the active magnetic bearings and a controller (not shown in FIG. 3) mounted external to the pump unit 300, as well as between one or more position sensors, which may be integral to the magnetic bearings or discrete from them, and the controller. Such wires would typically pass through the bodies in which the active magnetic bearings and sensor(s) are mounted, and they should be isolated from hostile environments (e.g., corrosive fluid, etc.). FIGS. 7A and 7C illustrate typical positions for drilled-port conduits 701 between the radial magnetic bearings 315, 316, 324, which for the purposes of this discussion include active elements, and the outer surfaces of the motor 226 and the pump 214. Because the static portions of the radial magnetic bearings 315, 316, 324, which contain the position-sensors and active magnetic elements of the active radial magnetic bearings, reside outside the HPRCs 325, 329, which are secured by seals 326, the conduits 701 are not exposed to process pressure or process fluid, and instead are substantially pressure-balanced to the external environment pressure and typically bathed in the same medium used to fill the stator cavity 335. Therefore, any conventional pressure-balanced connector may be used for attaching conduit-tubes to protect the noted wires over the spans that run between the noted bodies and the controller 702 (ref. FIG. 7B).

Circumstances are different, however, for data communication and power transfer associated with typically dedicated axial magnetic bearings 318, which for the purposes of this discussion include active elements. In this case the bearings and sensor(s) are exposed directly to process pressure and fluids (i.e., an environment for which they are purposely designed), and the aforementioned wires (not shown in FIG. 3) at some point pass through a high-differential-pressure-rated interface (not shown in FIG. 3). FIGS. 7A-7C illustrate an alternative concept that avoids passing wires through a high-differential-pressure-rated interface. The simplified diagram of FIG. 7B shows a shaft 703, a magnetic bearing 704 supporting shaft 703, a discrete sensor 705 for monitoring the position of shaft 703 relative to magnetic bearing 704, and one-half of a non-penetrating cross-pressure-vessel transceiver device 706, all within a pressure housing 707 that defines a pressure environment 708. A controller 702 associated with the second half of the transceiver device 706 is packaged inside a separate pressure housing 709 and communicates with, and provides power to, sensor 705. Similarly, the controller 702 provides power via transceiver device 706 to magnetic bearing 704 to adjust and control the position of the shaft 703. FIGS. 7A and 7C show a representation of the packaging of the sensor 705 and the transceiver device 706 proximate the axial magnetic bearings 318. The two halves of transceiver device 706 are shown separated in FIGS. 7A and 7C at position 710 associated with conduit 711. Whereas throughout the foregoing discussion and illustrated in the associated figures a single transceiver device 706 is described for transferring power and communication signals, multiple transceiver devices 706 may be employed as needed for specific applications. Furthermore, one or more transceiver devices 706 may be used to communicate data and/or control signals and/or to transfer power between any number of associated devices. An exemplary, non-penetrating interface of the type introduced above is described in United States Patent Publication No. 2008/0070499, entitled "MAGNETIC COMMUNICATION THROUGH METAL BARRIERS," and incorporated herein by reference in its entirety. This publication describes a communication device that uses a magnetic signal to communicate through the pressure boundary without actually penetrating the boundary.

The motor outer housing 333 is press-fit to the stator 323 to promote the transfer of heat therebetween and further into the surrounding environment. The outer housing 333 may be constructed from a variety of metallic or non-metallic materials that satisfy the structural strength requirements and promote heat transfer and/or increased resistance to external deposits accumulation. Calcareous deposits and biofouling may be issues for high-temperature surfaces, especially metallic surfaces, in contact with sea water. As discussed further below, the stator 323 may be unitized with the HPRC 325 or supported by some other means than suspension within an outer housing 333. In such circumstances, alternative means and material options become available for isolating the stator 323 from the ambient environment while promoting heat-flow there-into, e.g. "bags"/"bladders", "shrink wrap", composite-fiber windings and/or laminates, and coating solutions, among others.

The housing 333 is unitized to the crown-flange 328 and pump body 308 to transfer to the latter the end-loads imparted by pressure acting on the former.

A pressure-balanced high-voltage penetrator 334 is secured to the crown-flange 328 to conduit external electric power to inside the stator cavity 335.

FIG. 4 illustrates how axial loads on the motor 226 (see FIG. 3), including pressure loads, may be transferred into the pump body 308 such that outer housing 333 wall thickness and associated heat-transfer resistance may be minimized. The HPRC 325 is the pressure barrier between the motor 226 internal and external environments while the outer housing 333 is an environmental barrier (separating fluids of different properties) not subject to significant pressure differential. One or more devices including bellows, floating pistons and the like known to those skilled in the art are typically integrated in the motor design to compensate volume changes that occur naturally in the stator cavity 335, e.g. due to thermal effects, to ensure the pressure therein is maintained substantially balanced with respect to the ambient environment. Any pressure imbalance, therefore, can be attributed to the pressure-induced force required to displace the compensating device. The stator cavity 335 is defined substantially by the HPRC 325, the outer housing 333, the crown-flange 328 and the base-flange 327.

Figure 4A:
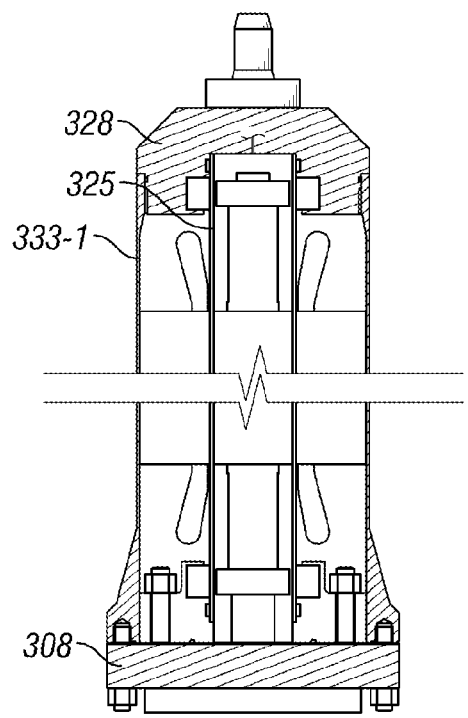
FIGS. 4A-4C illustrate techniques to allow motor axial loads, including pressure loads, to be transferred into the pump body such that motor outer housing wall thickness and associated heat-transfer resistance may be minimized.
Figures 1, 4B:
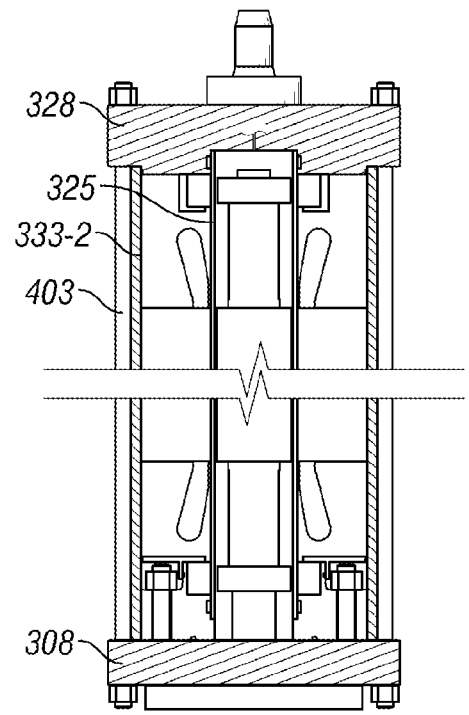
Figures 2, 4B:
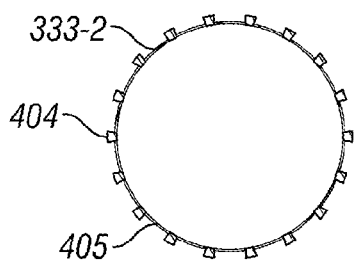
Figure 4C:
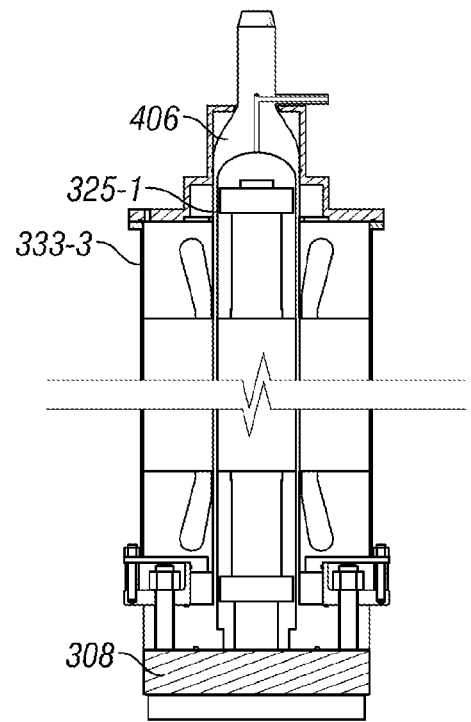

In some embodiments, the HPRC 325 may be prevented from experiencing significant axial loads. The first two concepts shown in FIGS. 4A and 4B are consistent with that approach. In another embodiment, the HPRC 325 may be designed to carry pressure-induced axial as well as radial/circumferential loads, among others, as illustrated in FIG. 4C. The noted/illustrated concepts are not intended to be exhaustive, and the subject matter includes all embodiments that involve an HPRC designed to carry substantial pressure loads either partially or completely, and/or in combination with or independent of the motor outer housing 333 or associated items.

The embodiment of FIG. 4A includes an HPRC 325 that is prevented from carrying significant axial loads. To support that attribute, the loads imposed by internal and/or external pressure acting on the crown-flange 328, and other loads, are transferred to the pump body 308. The outer housing 333-1 is designed to withstand net axial tensile and compressive loads associated with internal and external pressure, respectively, acting on the HPRC 325. The outer housing 333-1 is also designed to withstand other loads imposed thereon, including bending loads possibly imposed by external sources.

The embodiment shown in FIGS. 4B-1 and 4B-2 illustrate a different mechanism for addressing the objectives achieved by embodiment of FIG. 4A. The outer housing 333-2 is clamped by tie-rods 403 to create a system for carrying axial compression and tension loads, respectively. The embodiment of FIG. 4B-1, 4B-2 exploits the fact that relevant compression loads are anticipated to be substantially lower than tensile loads and therefore the housing 333-2, which carries primarily compression loads, may be much thinner than its counterpart housing 333-1, which must also withstand tensile loads. A thinner outer housing 333-2 improves heat transfer across the housing 333-2. Heat transfer may be further improved for the housing 333-2 by employing a cross-section geometry that masses compression-load-resisting material into ribs 404, or similar features, to facilitate large expanses of interspersed thin wall section spans 405, as shown in FIG. 4B-2.

The HPRC 325-1 illustrated in the embodiment of FIG. 4C enables the thinnest potential motor outer housing 333-3. Because the HRPC 325-1 incorporates a bell-housing upper enclosure 406 and seals directly to the pump body 308, the HPRC 325-1 is substantially a conventional pressure vessel designed to withstand all loads imposed on it, including pressure, external mechanical force, temperature, etc.

Many alternative configurations consistent with the principles described above and illustrated in the embodiments of FIGS. 4A-C may be envisioned by one of ordinary skill in the art.

FIGS. 5A-5E-2 illustrate alternative cooling elements that may be provided for a pump unit 501, such as the pump unit 300 of FIG. 3. In some embodiments, forced cooling is not required, but rather heat generation is minimized and heat dissipation to the surrounding environment, i.e. passive cooling, is optimized.

FIGS. 5A-5D illustrate exemplary forced cooling alternatives that may be applicable for some embodiments. A dedicated pump, typically electrically or hydraulically driven, is also an alternative source for forced cooling. Forced cooling may be implemented for applications where it is not essential to acceptable performance/reliability of the pump module 201, yet is desired to increase robustness. It is also conceivable that forced cooling may be implemented for applications where it is important to the reliable performance of the pump module 201; that is, failure of the forced cooling system implies failure of pump module 201. In such situations, it is necessary to understand thermal conditions that will occur inside the pump module 201 following planned and unplanned shut-down/failure of the forced cooling system.

The discussion below associated with FIGS. 6A-6F, which describes power sources for various pumps and their respective availability with respect to process flow, is also relevant to forced cooling.

Figure 5A:
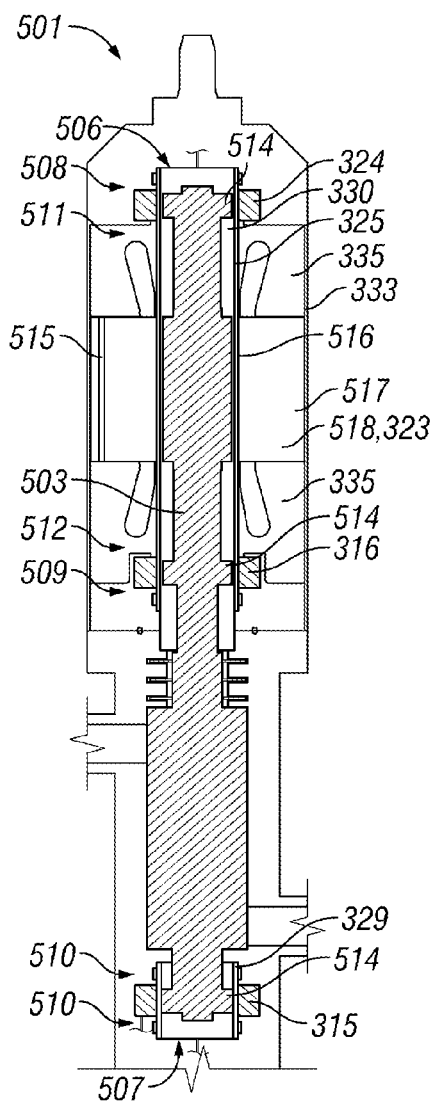
Figure 5B:
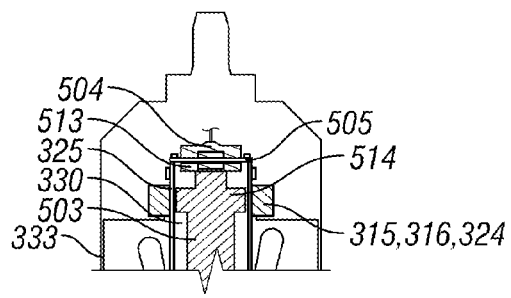
Figure 5C:
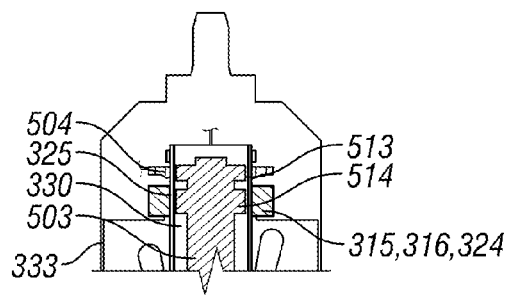
Figure 5D:
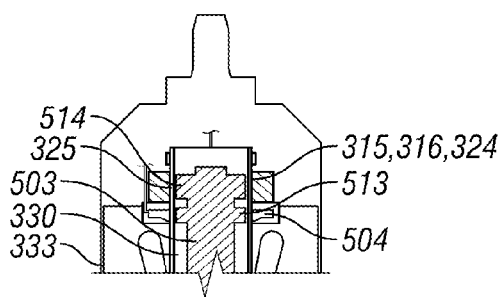

FIG. 5A is a simplified cross-section view of the pump unit 501 illustrating exemplary positions for a pump-unit-internal cooling-fluid-circulation-pump-impeller 504 that can be driven by permanent magnets attached to any part of an integrated rotating element 503. FIGS. 5B, 5C, and 5D are detail-views associated with the FIG. 7A showing how the impeller 504 may be isolated by different HPRCs 325, 329, 505 corresponding to various positions. While the embodiments illustrated in FIGS. 5B, 5C, and 5D are derived from the upper portion of the pump unit 501 shown in FIG. 5A, they are intended to represent various similar regions within the pump unit 501 of FIG. 5A. For example, the embodiment of FIG. 5B applies to positions 506, 507, the embodiment of FIG. 5C corresponds to positions 508, 509, 510, and the embodiment of FIG. 5D corresponds to positions 511, 512.

FIGS. 5B, 5C, and 5D illustrate dedicated permanent magnets 513 attached to integrated rotating element 503 to achieve cooling fluid circulation pump functionality. As an alternative, rotating permanent magnets 514 associated with magnetic bearings 315, 316, 324 may be used to drive the impeller 504, possibly with some modification (e.g., lengthening).

Stator conduits 515, 516, 517 allow fluid to circulate within the stator cavity 335 in response to naturally occurring thermal currents and/or forced circulation driven by an associated pump, represented by the impeller 504. They may also be used as conduits for routing wires for various purposes. A dedicated pump (not shown) not integral to pump unit 501 is another of many potential alternatives to cause fluid to circulate through the noted conduits. While not specifically shown, it is apparent to one of ordinary skill in the art that appropriate barriers/restrictions may be provided to achieve and/or direct appropriate circulation flow. Stator conduits 515, 516, 517 run from one side of the stator core laminations stack 518 to the other, and are positioned anywhere across the radial expanse of the stack 518 (i.e., fully within the radial expanse 518), adjacent the inside diameter 516 or adjacent the outside diameter 517. The conduits 516, 517 may be wholly or partially within adjacent items, such as the HPRC 325 and the outer housing 333, respectively.

Figures 1, 5E:
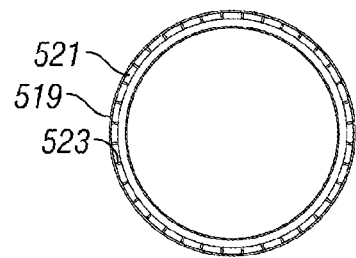
Figures 2, 5E:
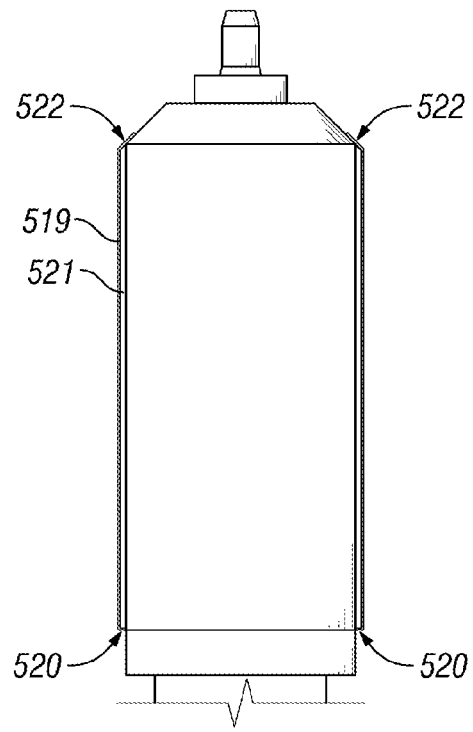

FIGS. 5E-1 and 5E-2 illustrate cross-section and plan views for a shroud 519 surrounding the housing 333. The shroud 519 may also extend over a greater expanse of the pump unit 501 to increase its effect, depending on the particular implementation.

Because the pump unit 501, and especially the stator 323, will transfer a significant amount of heat to the surrounding environment, convection currents will evolve therein. The greater the temperature gradient imposed on the surrounding environment, the stronger the convection currents. The shroud 519 will tend to hold conducted/radiated heat near the housing 333 and thereby increase the thermal gradient between the top and bottom thereof. This will naturally increase the influx of cool environmental fluid into the bottom 520 of an annulus 521 and accelerate the fluid vertically across housing 333 on its way to exhausting out the top 522. This effect will expose the housing 333 to more cool fluid from the surrounding environment than would have been the case if the shroud 519 were not present. This effect may be enhanced by insulating the shroud 519 or by constructing the shroud 519 using a material with insulating properties; however, this is subject to specific design and application environment considerations.

Stand-off ribs 523 act as cooling fins to conduct additional heat from the housing 333 to the environment. In some cases, cooling fins (i.e., stand-off ribs 523 without the surrounding housing 519) may provide adequate cooling.

Various alternatives for the system illustrated in FIGS. 5E-1 and 5E-2 are anticipated. For example, stand-off ribs 523 could be provided with a helical shape to force environment/cooling fluid to follow a single or multiple spiral path(s) around the housing 333, thereby increasing the residence time for that fluid within the annulus 521 and increasing their own surface area to enhance heat-transfer effects. Furthermore, a pump (e.g., dedicated unit, impeller associated with integrated rotating element 503, etc.) could drive a fan/impeller to force fluid through a single or multiple path(s) in the annulus 521.

Various materials may be employed for stator cooling, e.g., mineral oil or water-glycol based fluids, which are especially relevant for actively cooled/pumped systems requiring fluid circulation. For a passive cooling system a high-viscosity heat transfer compound, such as compounds offered by Thermon Manufacturing Co. of San Marcos, Tex. may be employed. Other compounds may also be used, such as those that can absorb and dissipate relatively large amounts of heat over a relatively small temperature range as they change phases, e.g. when liquid perfluorinate vaporizes and condenses. The particular cooling medium depends on the heat conduction and electrical insulation requirements of the particular implementation. Materials other than the exemplary materials illustrated herein may be used.

Figure 6A:
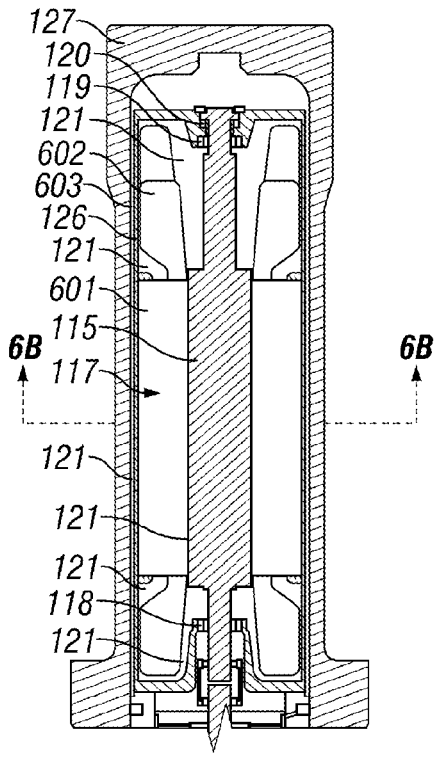
FIGS. 6A-6B illustrate features of a prior art motor stator.
Figure 6B:
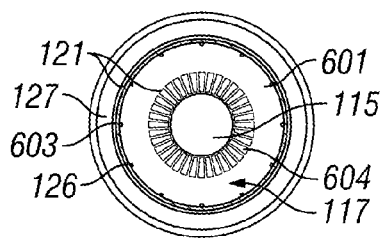

FIGS. 6A-6F illustrate some of the differences in topology between the motor stator 323 of FIG. 3 and its associated items and the corresponding items for prior art designs. As depicted in FIGS. 6A and 6B, prior art rotors 115 and stators 117 typically share the same fluid environment, especially for underwater applications in which they are immersed in a barrier/cooling fluid 121 within a surrounding motor housing 127, as discussed previously. The stator 117 core laminations 601 are aligned within the stator housing 126 to position and secure them relative to each other and to other assembly components including the bearings 118, 119, 120 and stator windings 602. The stator housing 126 provides protection to the stator 117 during its assembly into the motor housing 127, and also transfers mechanical loads into the motor housing 127. The interface between the stator housing 126 and the motor housing 127 creates and maintains a radial design clearance 603 therebetween through which barrier/cooling fluid 121 can flow. FIG. 6B is a cross-section view of FIG. 6A at the indicated location. Winding slots 604 represent the conduits into which windings 602 are placed.

As depicted in FIGS. 6C-6F, the rotor 319 resides in a rotor cavity 330 defined by the HPRC 325 in association with other items. The stator 323 includes core laminations 605 and windings 606 secured within the stator cavity 335 in any of several alternative ways described below. The rotor cavity 330 and the stator cavity 335 fluid environments are separated by the HPRC 325.

Figure 6D:
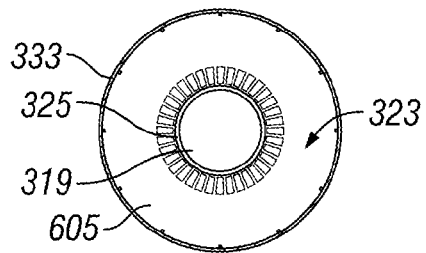
FIGS. 6C-6F illustrate features of alternate stators and associated items for the pump unit shown in FIG. 3.
Figure 6C:
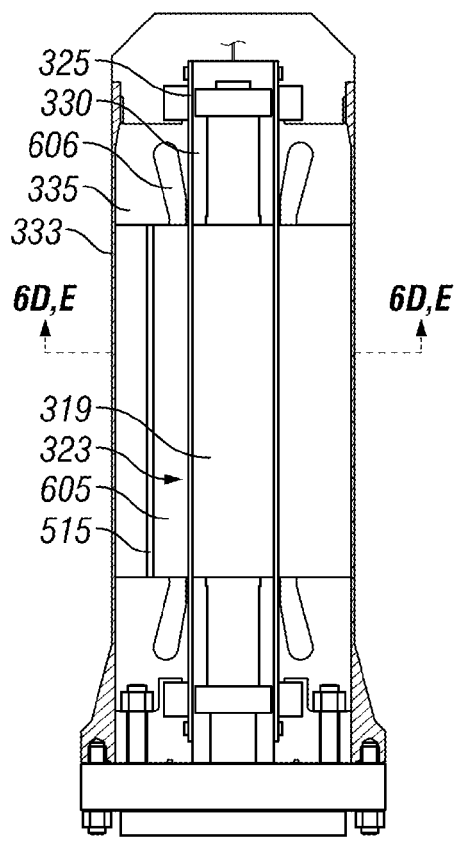

As depicted in FIG. 6C and cross-section view FIG. 6D, an exemplary fixity for the stator 323 within the stator cavity 335 includes core laminations 605 pressed (i.e., interference fit) into the outer housing 333, providing optimum heat-flow therebetween. A vacuum-resin impregnation process may be used to remove voids and subsequently unitize and rigidize the stator core laminations 605 and stator windings 606 prior to pressing the stator 323 into the outer housing 333 or subsequent to the latter operation. If used, and regardless of the application sequence, the outside diameter of the stator 323 may be machined to provide a smooth, constant diameter surface for interfacing with the housing 333. To facilitate downstream assembly for this fixity alternative there may be an ambient temperature clearance gap between the internal diameter of the stator 323 and the outside diameter of the HPRC 325. This gap may or may not be designed to close in response to differential pressure, magnetic loading, and/or thermal expansion of relevant parts, etc., during motor operation.

An alternative fixity embodiment for the stator 323 includes stator core laminations 605 that are closely fit or pressed over the HPRC 325. A vacuum-resin impregnation process may be used to remove voids and subsequently unitize and rigidize the stator core laminations 605 and stator windings 606 prior to installing the stator 323 over the HPRC 325 or subsequent to the latter operation. If performed subsequently, a more positive bond may be established between the stator 323 and the HPRC 325 to create a composite structure with enhanced resistance to external pressure as well as internal pressure. This construction will more effectively share loads between the stator 323 and the HPRC 325 than the previously discussed construction and in so doing may permit a reduced cross-section thickness for either or both elements, with accordant respective benefits. A thinner stator provides less thermal mass between the heat source (rotor coils) and the heat sink (surrounding water). A thinner HPRC enables less distance between the stator and rotor for improved motor power factor. If used, and regardless of the resin bonding versus assembly sequence, the inside diameter of the stator 323 may be machined to provide a smooth, constant diameter surface for interfacing with the HPRC 325.

Figure 6E:
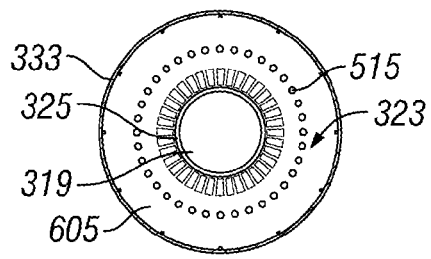

The aforementioned alternative embodiment will, for ease of downstream assembly purposes, typically provide a clearance gap or only light interference fit between the outside of the stator 323 and the inside of the outer housing 333. To deliver high-performance heat-transfer properties, a thermal bridge may be provided. For the purpose of this disclosure a thermal bridge includes any heat conducting object or material that facilitates transfer of heat from one location to another, such as across a radial gap between the stator 323 and the outer housing 333 over at least a portion of the longitudinal and circumferential expanse of said gap. Some examples of suitable thermal bridge constructions include belleville washers, wave springs, accordion-bellows, longitudinal rods, longitudinal wave filaments, "finger" filaments, mesh, helical-coil springs arranged longitudinally or in circumferential bands or in a spiral, etc. Heat-conducting fibers pressed between the laminations and oriented to radiate from the inner part of the core stack (e.g., between the windings) to outside the core stack and engaging the inside of the outer housing 333 is one thermal bridge construction that also creates radial channels between the laminations in which coolant may flow and/or in which a high-thermal-conductivity compound may be placed. Other thermal bridge constructions include filling the gap with a thermal bridge substance post-assembly, and/or integrating tines protruding from the stator core laminations 605, typically providing an interference-fit local to the tines. Heat transfer efficiency across the thermal bridge will generally be proportional to the contact area between the thermal bridge and adjacent items. FIG. 6E shows optional stator fluid circulation conduits 515.

Another alternative fixity embodiment for the stator 323 is a combination of the two preceding options. Specifically, the stator core laminations 605 are in direct and maintained contact with both the HPRC 325 and the external housing 333 in a manner that causes loads to be shared and heat to be efficiently transferred between them. Depending on a combination of factors including sourcing, logistics and other supply chain considerations, among others, the timing for implementing the vacuum-resin impregnation process may be a contributing factor to the effectiveness of the construction, i.e., before, during, or post-assembly of various components making up the composite construction.

Figure 6F:
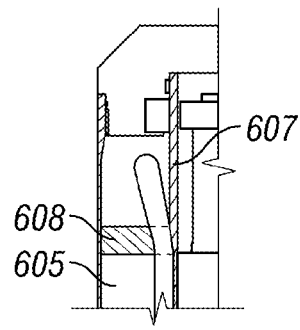

FIG. 6F shows an alternative embodiment for an HPRC 607 interfacing with the stator 323 via a transition element 608. For some high-pressure applications in which the stator 323 provides substantial radial support to the HPRC 325 it may be necessary to increase the wall thickness of the unsupported expanse of the HPRC 607. The area over which the HPRC 607 changes wall thickness is important from a stress distribution perspective, and the transition element 608 with an ideal fit, for example as assured via the vacuum-resin impregnation process, can provide support. Whereas several of the previously described HPRC 325 configurations emphasize fiber orientation to restrain predominantly radial and circumferential loads, the HPRC 607 fiber orientation also resists potentially significant bending forces associated with the change in wall section. It may be that a concentration of substantially longitudinally-oriented fibers, or similar, may be integrated into the fiber lay-up local to the noted geometry change to address this issue. Various techniques for optimizing fiber placement to achieve minimum section thickness in all areas of HPRC 325, e.g., multi-layer and multi-axis winding, multi-layer weave-laminations, etc., are known to those of ordinary skill in the art.

Yet another alternative fixity embodiment for the stator 323 includes filling the stator cavity 335 with a material that fully unitizes motor static elements from structural and thermodynamic perspectives. The result is a stiff composite structure capable of withstanding extreme pressure differentials. From a practical perspective, such a material should accommodate introduction to the cavity 335 post-assembly of surrounding components, e.g., in the manner of the vacuum-resin impregnation process typically used to stabilize stator constructions. In fact, "stator resin" (typically epoxy) is one candidate material for the subject alternative embodiment fixity application, however its thermal properties make it less attractive than some alternatives. Other materials, including metallic materials and various close-packed powders, particles, beads, etc., may be candidates, as may combinations of such materials and/or thermal bridge constructions.

Generally, the magnitude of differential pressure across the HPRC 325 contributes significantly to the determination of the optimum fixity approach. As demonstrated by the several foregoing alternatives, the stator 323 provides structural support to the HPRC 325, and vice-versa, for applications that would benefit from such an effect.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the disclosed subject matter. Accordingly, the protection sought herein is as set forth in the claims below.

What is claimed:
1. A rotating apparatus, comprising:
 a housing;
 a shaft at least partially disposed within a first pressure environment defined by the housing;

a first magnetic bearing supporting the shaft and being at least partially disposed within the first pressure environment;

a sensor operable to sense a position of the shaft relative to the first magnetic bearing;

a controller disposed in a second pressure environment independent of the first pressure environment and operable to communicate with the sensor and to generate a control signal for the first magnetic bearing based on the sensed position; and a communication device operable to communicate the control signal between the controller and the first magnetic bearing and to communicate the sensed position between the sensor and the controller without penetrating a pressure boundary defined between the first and second pressure environments, wherein the communication device is operable to provide a modulated power supply as the control signal for the first magnetic bearing for affecting a strength of a magnetic force generated by the first magnetic bearing, and the controller is operable to control the modulated power supply based on the sensed position.

2. The apparatus of claim 1, wherein the housing comprises a vessel surrounding at least a portion of the shaft to define the first pressure environment.

3. The apparatus of claim 2, further comprising an outer housing defining the second pressure environment between the outer housing and the vessel.

4. The apparatus of claim 2, wherein the vessel further comprises a can.

5. The apparatus of claim 4, wherein the shaft further comprises a rotor, wherein the can encloses at least a portion of the rotor.

6. The apparatus of claim 2, wherein the vessel further comprises a motor body.

7. The apparatus of claim 2, wherein the vessel further comprises a pump body.

8. The apparatus of claim 1, wherein the bearing comprises an active portion and a passive portion, and the controller is operable to generate the control signal for the active portion.

9. The apparatus of claim 1, wherein the first magnetic bearing comprises a thrust bearing portion and a radial bearing portion, and the controller is operable to generate a first control signal for the thrust bearing portion and a second control signal for the radial bearing portion.

10. The apparatus of claim 1, wherein the communication device includes a plurality of units cooperating to provide the modulated power supply for the first magnetic bearing.

11. The apparatus of claim 1, wherein the communication device comprises a first unit operable to communicate the sensed position between the controller and the sensor, and a second unit operable to provide the modulated power supply to the first magnetic bearing.

12. The apparatus of claim 1, wherein the communication device is operable to provide a power supply for the sensor.

13. The apparatus of claim 12, wherein the communication device comprises a first unit operable to communicate the sensed position between the controller and the sensor, and a second unit operable to provide the power supply to the sensor.

14. The apparatus of claim 1, wherein the communication device comprises a first unit operable to provide a power supply to the first magnetic bearing and the sensor.

15. A pump unit, comprising:
a pump operable to pump a fluid; and
a motor operatively coupled to the pump, the motor comprising:
a housing;
a rotor; and
a stator disposed around the rotor in a stator cavity;
a first can interfacing with the housing to isolate the stator from the rotor to at least partially define a rotor cavity separate from the stator cavity;
a first magnetic bearing supporting the rotor and at least partially disposed within the rotor cavity;
a sensor operable to sense a position of the shaft;
a controller disposed outside the rotor cavity and operable to communicate with the sensor and generate a control signal for the first magnetic bearing based on the sensed position; and
a communication device operable to interface with one of the housing or the can to communicate the control signal between the controller and the first magnetic bearing through a pressure boundary defined between the stator cavity and the rotor cavity without penetrating the pressure boundary.

16. The pump unit of claim 15, wherein the first magnetic bearing comprises an active portion and a passive portion, and the controller is operable to generate the control signal for the active portion.

17. The pump unit of claim 15, wherein the first magnetic bearing comprises a thrust bearing portion and a radial bearing portion, and the controller is operable to generate a first control signal for the thrust bearing portion and a second control signal for the radial bearing portion.

18. The pump unit of claim 15, wherein the communication device is operable to provide a modulated power supply as the control signal for the first magnetic bearing for affecting a strength of a magnetic force generated by the first magnetic bearing, and the controller is operable to control the modulated power supply based on the sensed position.

19. The pump unit of claim 18, wherein the communication device includes a plurality of units cooperating to provide the modulated power supply for the first magnetic bearing.

20. The pump unit of claim 18, wherein the communication device comprises a first unit operable to communicate the sensed position between the controller and the sensor, and a second unit operable to provide the modulated power supply to the first magnetic bearing.

21. The pump unit of claim 15, wherein the communication device is operable to provide a power supply for the sensor.

22. The pump unit of claim 21, wherein the communication device comprises a first unit operable to communicate the sensed position between the controller and the sensor, and a second unit operable to provide the power supply to the sensor.

23. The pump unit of claim 15, wherein the communication device comprises a first unit operable to provide a power supply to the first magnetic bearing and the sensor.

* * * * *